W. J. Thorne,
Comb.
No. 9732.  Patented May 17, 1853.
Fig: 1.
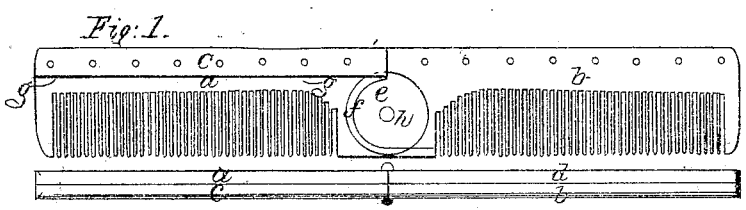
Fig: 2.
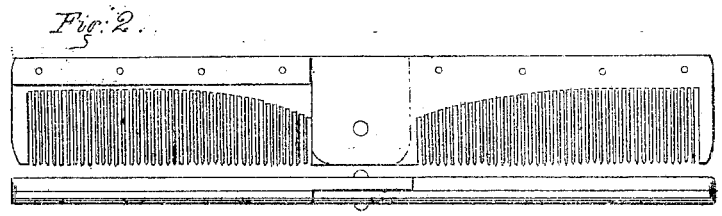

UNITED STATES PATENT OFFICE.

WM. J. THORN, OF WESTBROOK, MAINE.

POCKET-COMB.

Specification of Letters Patent No. 9,732, dated May 17, 1853.

*To all whom it may concern:*

Be it known that I, WILLIAM J. THORN, of Westbrook, in the county of Cumberland and State of Maine, have invented a new and useful Improvement in the Manufacture of Pocket-Combs, of which the following is an exact description.

The nature of my improvement consists in coupling two combs cut from one piece of ivory or horn or wood together by a round joint.

Combs have heretofore been coupled or connected together by a square joint, by means of which they could not be cut or sawed from one piece of stock without weakening their strength and wasting material.

By my invention, stock is saved, the comb is made from one piece, is neater, handsomer, and better; and I do hereby declare the following to be a full and exact description of the same, reference being had to the accompanying drawings and forming a part of this specification.

Single pieces of horn are cut in the usual manner for forming the two sides of the comb. Upon the inside of each main piece a, b, narrow strips c, d, of horn of proper width and thickness is riveted flush with the top of the main piece extending its whole length, with a groove of sufficient width and depth cut on the underside of the strip to receive the tooth edge of the corresponding main piece when coupled together as shown in Fig. 1. The main pieces of the comb at their coupling end are made semicircular as shown at e, the semicircular end being beveled upon the outer side as shown at f so as to work in the groove p formed in the strips c, d. The comb being finished and thrown open, the inner ends of the strips rest against the inner ends of the top portion of the opposite main piece, thus forming a permanent bearing; and the joint when the comb is open being directly on a line with the center of the rivet h which confines the two main pieces together. By this mode of manufacture I am enabled to cut the teeth much nearer the inner ends of the main pieces of the comb without impairing their strength, and also attain greater strength by reason of the strips—extending the whole length of the main piece.

By the old mode of making the pocket comb, the teeth cannot be cut so near the inner end of the main pieces,—the strength of the joint is not preserved by their inner ends working beneath the strips, and their inner ends are made square thus requiring more stock, as shown in Fig. 2.

Having thus described my improved method of manufacturing pocket combs, what I claim as new therein and desire to secure by Letters Patent is—

The manufacture of pocket-combs with semicircular joints in combination with strips overlapping them—substantially in the manner and for the purpose as herein set forth.

WM. J. THORN.

Witnesses:
WM. WILLIS,
JAMES D. FESSINDEN.